United States Patent Office 3,022,217
Patented Feb. 20, 1962

3,022,217
FUMIGATING COMPOSITION
Clifford C. Roan and Lallan Rai, Manhattan, Kans.
No Drawing. Filed Apr. 13, 1959, Ser. No. 805,661
4 Claims. (Cl. 167—39)

This invention relates to new and improved fumigant compositions for fumigating insect-infested grain and especially to fumigant compositions containing mxtures of chloroform and ethylene dibromide and tertiary mixtures containing ethylene dibromide, chloroform, and carbon disulfide.

Such compositions have the advantage of ease of applicability to grain bins and grain piles, complete penetration throughout the entire grain mass, and a high killing effect with the use of a minimum amount of the fumigant composition.

Many mixtures of low boiling and volatile organic liquids have been suggested as fumigants, and such chemicals as carbon tetrachloride, ethylene dichloride, carbon disulfide, ethylene dibromide, methyl bromide, chloropicrin, and sulfur dioxide have been employed in various combinations or alone for the control of stored products insect pests. The control of insect infestation in stored grain is conveniently accomplished by applying the fumigant toxicant, in liquid form, upon the surface of the grain mass. This liquid fumigant evaporates and forms a heavier-than-air gas or gases. This gas or combination of gases sinks through the mass of grain, replacing the air between the kernels, killing all existing insects in the grain mass. The gas or gases also penetrate the grain kernels themselves killing all stages of insects which may be inside of the kernels.

With increased inventories of surplus grains, the economical control of stored products insect pests has become a problem of major importance. Throughout the world losses to stored grain due to insects has been estimated at 5% to 10% of the total annual production.

Much time and money has been expended by both governmental and private agencies in an effort to evolve economical control methods for grain infesting insects. However, the amounts needed to secure satisfactory pest control, of the commonly used chemicals or mixtures of chemicals are so large that the cost of efficient treatment may be prohibitive. Furthermore, the efficiency of the control obtained with the commonly used toxicants are frequently erratic and unsatisfactory even at relatively high rates of application due to various factors. This variation may result from chemically selective action against the various kinds of insects, resulting in the killing of only a few of the major infesting insects, sorption properties of the stored grain which reduce the killing properties of some of the chemical gases, vaporization characteristics of some gas mixtures, and non-uniformity of distribution of killing dosages of the fumigant gases throughout the grain masses.

According to the present invention, improved fumigant mixtures are provided which comprise mixtures which contain as a major toxic ingredient chloroform containing a substantial amount of ethylene dibromide, including ternary mixtures which contain chloroform, carbon disulfide, and ethylene dibromide in substantial amounts. It is an object of the present invention to provide new and impoved fumigant compositions which will control grain insects generally.

A still further object is to provide fumigant mixtures which will be effective at lower concentrations than many commonly known fumigants and will accomplish the control of insects without imparting undesirable properties to the treated grain. Other objects will become apparent from the following specification and examples.

According to the present invention, improved fumigant mixtures are provided which comprise as a major toxic ingredient a solution of ethylene bromide in chloroform. Further improved tertiary fumigant mixtures are provided which comprise as a major toxic ingredient a solution of ethylene bromide and carbon disulfide in chloroform. These new fumigants have been found superior with respect to their control of grain pests. A further advantage resides in the fact that with such compositions, the use of special containers and special applicators, as required with many volatile organic materials such as methyl bromide or hydrogen cyanide, is avoided. Also, the compositions do not adversely affect the germinating properties of the treated grain or impart odor or taste thereto, or result in objectionable residues that may adversely affect the public's health. The compositions are substantially nonflammable.

The relative value of carbon disulfide and ethylene dibromide as grain fumigant chemicals have been known in the arts for many years and many of the present commonly used liquid fumigant mixtures contain these two chemicals as active ingredients. Knowledge in the arts on the use of chloroform as a grain fumigant chemical has been relatively unknown, although limited toxicity tests reported by the United States Department of Agriculture have indicated chloroform alone to have the same order of toxicity as carbon tetrachloride alone to the major stored products insect pests. In view of the work done heretofore, it might be expected that a mixture of chloroform and ethylene dibromide or a mixture of chloroform, ethylene dibromide and carbon disulfide would have fumigant properties. What could not be predicted, however are the unique results which have been discovered, namely that combinations of the materials possess an unanticipated level of toxicity, considerably in excess of that to be anticipated from a summation of the independent toxicities of the several components, to insects. This invention relates to combinations of chemicals possessing, in their combined form, special value as insect fumigants.

Although other properties, i.e. physical and chemical, of a material are of importance in determining its value as an insect control agent, its biological action is of prime importance. Ideally a material selected for use as fumigant for insect control must possess a maximum toxicity to the major types of insects to be controlled and a minimum level of toxic hazard to man and domestic animals.

Combinations of materials possessing an unanticipated level of toxicity, although not unknown, as very infrequent and cannot be predicted from the relative toxicities of the components. It is the object of this invention to set forth compositions of matter that possess an unusual level of toxicity, considerably in excess of that to be anticipated from a summation of the independent toxicities of the several components.

EXAMPLE I

To establish the relative toxicities of these materials alone and in various combinations, insects (rice weevil, *Sitophilus oryzae* L.) were exposed in glass chambers to the gases from the materials listed. These tests were conducted under carefully controlled laboratory conditions designed to provide a critical appraisal of the toxicities of various chemicals and combinations thereof. The binary and tertiary mixtures were formulated with precision in the laboratory and represent, in essence, some of the commercial mixtures in common use. The units required to kill 99 percent of the population exposed have been transformed and weighted so as to provide whole numbers with the mixture consisting of five parts of ethylene dibromide dissolved in 95 parts of a mixture consisting of 80 parts carbon tetrachloride and 20 parts carbon disulfide used as a reference point equal to 100. The time period was 24 hours.

Table 1.—The relative units of certain chemicals and mixtures thereof required to kill 99% of the insects exposed

| Chemical or mixture used | Units required to kill 99% |
|---|---|
| 1. Ethylene dibromide | 5. |
| 2. Carbon disulfide | 75. |
| 3. Carbon tetrachloride | more than 1,000. |
| 4. Chloroform | more than 1,000. |
| 5. Five parts of ethylene dibromide dissolved in 95 parts of carbon tetrachloride. | 144. |
| 6. Five parts of ethylene dibromide dissolved in 95 parts of a mixture consisting of 80 parts of carbon tetrachloride and 20 parts of carbon disulfide. | 100. |
| 7. Five parts of ethylene dibromide dissolved in 95 parts of a mixture consisting of 70 parts carbon tetrachloride and 30 parts carbon disulfide. | 89. |

It may be observed from the above table that the ethylene dibromide and carbon disulfide are far more toxic to the insects than either carbon tetrachloride or chloroform. It may further be observed that ethylene dibromide is 15 times more toxic than the carbon disulfide when each chemical is used alone. Comparison mixtures of two commonly used commercial mixtures and one special comparison mixture all follow expected results with mixture #5 being the least toxic mixture and mixture #7 being the most toxic mixture.

In a similar fashion, the toxicity of solutions of ethylene dibromide in chloroform and tertiary mixtures of ethylene dibromide, carbon disulfide, and chloroform to the rice weevil was determined. Table 2 below sets forth both the calculated expected results from the use of chloroform instead of carbon tetrachloride and the unanticipated results obtained which illustrates the object of this invention.

Table 2.—The relative units of mixtures containing chloroform required to kill 99 percent of the insects exposed

| Mixture | Units | |
|---|---|---|
| | Expected | Observed |
| 1. Five parts of a mixture of ethylene dibromide dissolved in 95 parts chloroform. | ¹ 144 | 49 |
| 2. Five parts of a mixture of ethylene dibromide dissolved in 95 parts of a mixture consisting of 70 parts chloroform and 30 parts carbon disulfide. | ¹ 89 | 34 |

¹ Derived from Table 1.

The data in Table 2 clearly demonstrate that the substitution of chloroform for carbon tetrachloride in mixtures 5 and 7 of Table 1 results in a mixture with unusual and unpredictable toxic properties.

EXAMPLE II

The unusual toxicity of mixtures containing chloroform and ethylene dibromide having been established, it becomes necessary to determine the proportions of these constituents that provide the maximum benefit. It is obviously desirable to use the minimum amount of the most toxic ingredient that still manifests a maximum beneficial effect. These tests were conducted in essentially the same manner as those described in Tables 1 and 2, i.e. the toxicity of the mixtures to the rice weevil were evaluated. In this case the data presented are the observed mortalities rather than weighted values. The observed mortalities are used and values of 100 percent reported since no conversion to values of unity for reference purposes are necessary.

Table 3.—The mortalities of rice weevils resulting from an exposure to various mixtures of ethylene dibromide and chloroform in empty fumatoria for 24 hours

| Mixture | | Amount used | Percent Mortality |
|---|---|---|---|
| Chloroform, parts | Ethylene Dibromide, parts | | |
| 1 | 99 | 1 | 0.03 gal./1,000 cu. ft. | 8 |
| 2 | 98 | 2 | 0.03 gal./1,000 cu. ft. | 27 |
| 3 | 97 | 3 | 0.03 gal./1,000 cu. ft. | 56 |
| 4 | 96 | 4 | 0.03 gal./1,000 cu. ft. | 91 |
| 5 | 95 | 5 | 0.03 gal./1,000 cu. ft. | 100 |

The data in Table 3 clearly demonstrate that the lower limit for the ethylene dibromide is of the order of 4 to 5 parts in 96 to 95 parts chloroform at the dosage used. Below 3% there is no practical benefit since dosage would have to be increased inordinately. The upper limit of this benefit is not so readily apparent since the amounts of ethylene dibromide contained in the chloroform begin to exert an independent toxicity at ratios between 10–15 parts ethylene dibromide to 90–85 parts of chloroform.

EXAMPLE III

Although we have demonstrated the unusual toxicity of combinations of ethylene dibromide and chloroform or ethylene dibromide, chloroform and carbon disulfide, it is essential that this toxicity be capable of manifesting its action when the insects are in a grain mass. In this case, the insects were exposed in a grain mass in a closed container equipped with a blower and ducts so that the air and fumigant gases could be recirculated through the grain mass. The amount of the fumigant applied was 0.47 gal./1000 bu. of wheat.

Table 4.—Tests with S. oryzae in grain using recirculation (24 hours' circulation, count after 5 days)

| Mixture | Percent Mortality |
|---|---|
| 1. One part ethylene dibromide plus 99 parts of a mixture consisting of 70 parts chloroform and 30 parts carbon disulfide. | 14 |
| 2. Five parts ethylene dibromide plus 95 parts of a mixture consisting of 70 parts chloroform and 30 parts carbon disulfide. | 100 |

The data in Table 4 serve not only to demonstrate the effectiveness of this tertiary mixture as an insect fumigant but also further demonstrates the optimum ratio of the various components.

EXAMPLE IV

In tests of the action of mixture No. 2 of table 4, against S. oryzae in a grain mass without the benefits of recirculation, the tertiary mixture consisting of ethylene dibromide, chloroform and carbon disulfide was compared with the analogous carbon tetrachloride mixture. In this test the two formulations were applied at the rate of 0.28 gal./1000 bu. of wheat in a tightly sealed container, using about 100 lb. of grain. The results of this test are evident in Table 5.

*Table 5.—Tests with S. oryzae in grain (without recirculation, count after 5 days)*

| Mixture | Percent Mortality |
|---|---|
| 1. Five parts ethylene dibromide plus 95 parts of a mixture consisting of 70 parts chloroform and 30 parts carbon disulfide | 93 |
| 2. Five parts ethylene dibromide plus 95 parts of a mixture consisting of 80 parts carbon tetrachloride and 20 parts carbon disulfide [1] | less than 5 |

[1] A directly analogous mixture, i.e. 70 parts carbon tetrachloride and 30 parts carbon disulfide was not usable because of potential fire hazards. With mixture 2 about 4-5 times the dosage would be required to equal mixture #1.

These data clearly indicate the unusual toxic properties of mixtures of ethylene dibromide, and chloroform or ethylene dibromide, chloroform and carbon disulfide. We have not only demonstrated the unusual inherent toxicity of these mixtures but have further demonstrated the advantages of these mixtures when applied to grain in the manner customarily employed in control practice. In general the proportions of chloroform in the mixture is at least about 50%, and preferably about 55 to about 95%; the ethylene dibromide from about 3.0 to 15%, and the carbon disulfide 0.0 to about 30%—preferred ranges of mixtures of chloroform and ethylene dibromide are 85–97% of the former and 15–3% of the latter. The mixtures containing carbon disulfide may contain up to 30% by weight, beyond which the mixture may become a fire hazard. When carbon disulfide is used it is within a preferred range of about 15–30%. The use of ethylene dibromide in proportions below 3% provides little advantage. All percentages and parts are expressed as by volume unless otherwise noted.

The actual dosage depends upon a number of factors previously discussed and well known in grain fumigation art. The mixtures of this invention are effective in smaller dosages than are accepted commercial fumigants under like circumstances of application and environment, being about half that of existing formulations. This has been shown by commercial scale tests on wheat and milo which represent the extremes of ease and difficulty of fumigation.

The mixtures vaporize and distribute themselves uniformly throughout the grain mass with resultant unusual uniformity of fumigating effectiveness. Residues on the grain or milled products fall within Food and Drug Administration tolerances. The ease of application, lack of residual toxicity to humans and animals, absence of adverse effect on germination of the grain and high rate of kill of the usual grain insects are outstanding advantages for the composition. The unexpected fumigating effectiveness of the composition per unit applied provides an economic advantage over other mixtures, as well as added insurance that the grain will be effectively treated.

The foregoing examples are presented by way of illustration and are not intended to be unduly limiting. The mixtures are effective toxicants for well known grain pests other than those illustrated.

Small amounts of other fumigant materials may be added in certain circumstances to the extent that they do not change the basic and novel characteristics of the composition.

We claim as our invention:

1. A grain fumigant composition comprising as the essential pesticide about 50 to about 97.0% chloroform, about 3.0 to about 15% ethylene dibromide and 0 to about 30% carbon disulfide.

2. The fumigant of claim 1 wherein the composition contains about 15 to about 30% carbon disulfide.

3. The process of fumigating stored grain which comprises mixing with the grain in a container an effective amount of a composition comprising as the essential pesticide about 50 to about 97.0% chloroform, about 3.0 to about 15% ethylene dibromide, and 0 to about 30% carbon disulfide.

4. The process of claim 3 wherein the composition contains about 15% to about 30% of carbon disulfide.

References Cited in the file of this patent

UNITED STATES PATENTS

| 2,321,023 | Goodhue et al. | June 8, 1943 |
| 2,391,890 | Fletcher | Jan. 1, 1946 |
| 2,441,553 | Britton | May 18, 1948 |
| 2,803,581 | Hibbard | Aug. 20, 1957 |

OTHER REFERENCES

United States Dept. of Agr., Dept. Bull. No. 1313, January 26, 1925, page 25.